United States Patent
Voyer et al.

(10) Patent No.: US 8,254,952 B2
(45) Date of Patent: Aug. 28, 2012

(54) METHOD AND SYSTEM FOR EMITTING IN A DESTINATION AREA OF A MOVING CONVEYANCE, SIGNALS EMITTED BY A TELECOMMUNICATION DEVICE IN AN AREA LOCATED IN THE MOVING CONVEYANCE

(75) Inventors: Nicolas Voyer, Rennes Cedex (FR); Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 684 days.

(21) Appl. No.: 12/030,679

(22) Filed: Feb. 13, 2008

(65) Prior Publication Data
US 2008/0200183 A1 Aug. 21, 2008

(30) Foreign Application Priority Data
Feb. 14, 2007 (EP) .................................. 07003074

(51) Int. Cl.
*H04W 24/00* (2009.01)
*H04B 7/15* (2006.01)
(52) U.S. Cl. .................................. 455/456.1; 455/11.1
(58) Field of Classification Search ............... 455/432.1, 455/436–446, 448, 452.2, 456.3
See application file for complete search history.

(56) References Cited

U.S. PATENT DOCUMENTS
5,832,363 A * 11/1998 Moriya et al. ............... 455/11.1
6,381,458 B1 * 4/2002 Frodigh et al. ................ 455/442
2004/0203911 A1 10/2004 Masuda et al.

FOREIGN PATENT DOCUMENTS
EP          1 282 327 A2     2/2003
JP          6-255917         9/1994
WO       WO 01/15338 A1     3/2001
WO      WO 2005/053189 A1   6/2005

* cited by examiner

*Primary Examiner* — Lester Kincaid
*Assistant Examiner* — Joel Ajayi
(74) *Attorney, Agent, or Firm* — Oblon, Spivak, McClelland, Maier & Neustadt, L.L.P.

(57) ABSTRACT

A wireless telecommunication system includes a telecommunication device emitting signals in an area located in a moving conveyance while the moving conveyance is moving. Information is obtained representative of a destination area of the moving conveyance in which the signals emitted by the telecommunication device in the area located in a moving conveyance are not received. The signals emitted by the telecommunication device are obtained in the area located in a moving conveyance. The obtained signals are emitted in the destination area of the moving conveyance prior to the arrival of the moving conveyance in the destination area.

17 Claims, 5 Drawing Sheets

METHOD AND SYSTEM FOR EMITTING IN A DESTINATION AREA OF A MOVING CONVEYANCE, SIGNALS EMITTED BY A TELECOMMUNICATION DEVICE IN AN AREA LOCATED IN THE MOVING CONVEYANCE

The present invention relates to a method and a system for emitting in a destination area of a moving conveyance, signals emitted by a telecommunication device in an area located in the moving conveyance.

Wireless telecommunication systems are widespread in the world. They offer the possibility to remote receivers to receive signals, as example broadcasted programs, emitted by a telecommunication device even if the remote receivers or the telecommunication device are in a moving conveyance, as far as the remote receivers can receive the signals anytime during the motion of the moving conveyance and are not interfered by another telecommunication device emitting other signals on the same radio resource.

When the telecommunication device is located in a moving conveyance, the propagation of electromagnetic waveforms emitted by the telecommunication device to a remote receiver located outside the moving conveyance varies together with the motion of the moving conveyance. As a result, the reception of signals received by a remote receiver from another telecommunication device is abruptly interfered by a sudden raise of propagation of electromagnetic waveforms emitted by the telecommunication device located in a moving conveyance when the moving conveyance gets closer to the remote receiver.

Similarly, the reception of signals received by a remote receiver located outside the moving conveyance from a telecommunication device located inside the moving conveyance is abruptly interrupted by a sudden loss of propagation of electromagnetic waveforms emitted by the telecommunication device when the moving conveyance gets away from the remote receiver.

Such sudden modifications of propagation of electromagnetic waveforms between the inside and the outside of the moving conveyance are even more important when the moving conveyance attenuates the propagation of electromagnetic waveforms between the inside and the outside of the moving conveyance. Furthermore, the opening or the closing of the doors of the moving conveyance generate abrupt changes of the attenuations generated by the moving conveyance.

Remote receivers and/or telecommunication devices of classical wireless telecommunication systems are not designed for such abrupt modification of interferences.

Wireless telecommunication systems like wireless cellular telecommunication systems offer the possibility to mobile customers to continue a communication with a remote telecommunication device, even if they are moving, thanks to handover procedures between the base stations of the wireless cellular telecommunication system. During a handover, the mobile terminal of the mobile customer communicates with successive base stations with a different wireless interface, in which the base stations and the mobile terminal act as a telecommunication device and a remote receiver.

In some cases, especially when the mobile terminal is located in a moving conveyance which attenuates the propagation of electromagnetic waveforms, the communication is suddenly interrupted by a loss of the received electromagnetic signal or by unsuccessful handovers between the base stations of the wireless cellular telecommunication system.

Moving conveyances like elevators cabins attenuate the propagation of electromagnetic waveforms. Most of elevator cabins are built out of steel or surrounded by an elevator shaft made of concrete, which then forms a Faraday cage. No or strongly attenuated radio waveforms can penetrate into the elevator cabin from outside the elevator shaft or go out from the elevator cabin to outside of the elevator shaft. When the doors of the elevator cabin are closing, the communication of the mobile terminal located inside the cabin drops, as they can no longer receive any signal from outside the elevator cabin.

In some other cases, especially when the mobile terminal is located in a moving conveyance like a train or a subway train which attenuates the propagation of electromagnetic waveforms, the communication is also suddenly interrupted by a loss of the received electromagnetic signal or by unsuccessful handovers between the base stations of the wireless cellular telecommunication system.

When the moving conveyance arrives in a destination area, the signals received and/or emitted by the mobile terminals which are located in the moving conveyance disturb the mobile terminals and/or the base station located in that area. This is particularly the case when the doors of an elevator cabin open at one floor. The signals received and/or emitted by the mobile terminals which are located in the moving conveyance suddenly interfere with the one transferred by the base station and/or the mobile terminal located in the destination area. In the same way, the signals transferred by the base station and/or the mobile terminal located in the destination area interfere suddenly with the signals received and/or emitted by the mobile terminals which are located in the moving conveyance.

Mobile terminals and/or base stations of classical wireless cellular telecommunication systems are not designed for such abrupt modification of interferences.

Similar problems as the one disclosed for elevators arise for trains and subway trains.

The aim of the invention is therefore to propose a method and a system which make it possible to avoid any interruption of the reception by remote receiver located inside a moving conveyance, of signals emitted by a telecommunication device located outside the moving conveyance, to avoid any interruption of the reception by a remote receiver located outside a moving conveyance of signals emitted by a telecommunication device located inside the moving conveyance, and to avoid abrupt modification of interference conditions for remote receivers and/or a telecommunication device, like a base station or a mobile terminal of a wireless cellular telecommunication network.

To that end, the present invention concerns a wireless telecommunication system comprising a telecommunication device emitting signals in an area located in a moving conveyance, the moving conveyance being moving, characterised in that the system comprises:

means for obtaining information representative of a destination area of the moving conveyance in which the signals emitted by the telecommunication device in the area located in a moving conveyance are not received means for obtaining the signals emitted by the telecommunication device in the area located in a moving conveyance, means for emitting the obtained signals in the destination area of the moving conveyance prior to the arrival of the moving conveyance in the destination area.

The present invention concerns also a method for emitting signals emitted by a telecommunication device in an area located in a moving conveyance, the telecommunication device belonging to a wireless telecommunication system, the moving conveyance being moving, characterised in that the method comprises the steps of:

obtaining information representative of a destination area of the moving conveyance in which the signals emitted by the telecommunication device in the area located in a moving conveyance are not received obtaining the signals emitted by the telecommunication device in the area located in a moving conveyance, emitting the obtained signals in the destination area of the moving conveyance prior to the arrival of the moving conveyance in the destination area.

Thus, when the moving conveyance arrives in the destination area, the signals emitted by the telecommunication device in the area located in the moving conveyance don't disturb suddenly the other telecommunication device located in the destination area. As far as the signals emitted by the telecommunication device in the area located in the moving conveyance are also emitted in the destination area, there is no abrupt modification of interferences.

Thus, any remote receiver located in the destination area can receive the signals emitted by the telecommunication device in the moving conveyance, prior to the arriving of the moving conveyance, and take proper action that will result from the future presence of the telecommunication device in the destination area.

For example, and in a non limitative way, the remote receiver can start synchronisation on the signals emitted by the telecommunication device, or can start reception of data carried by the signal emitted by the telecommunication device, or can start making measurements of level of signals received from the telecommunication device in order to prepare a handover, or can adjust usage of radio resource in the destination area so as to minimise the impacts of interference produced by the arriving in the destination area of the moving conveyance in which the telecommunication device is located.

According to a particular feature, the wireless telecommunication system is a wireless cellular telecommunication system, the telecommunication device is a base station and the area located in a moving conveyance is a cell of the base station.

Thus, as the signals emitted by the base station in the cell are also emitted in the destination area, mobile terminals located in the destination area are able to measure the signals emitted by the base station and a handover may be executed with the base station which emits the signals in the cell comprised in the moving conveyance. The time to establish a handover procedure with the cell of the base station is reduced. Quality of communication of mobile terminals which move in and out of the moving conveyance is improved.

According to a particular feature, the wireless cellular telecommunication system comprises means for interrupting the emission of the obtained signals in the destination area of the moving conveyance once the moving conveyance is arrived in the destination area.

Thus, when the moving conveyance arrives in the destination area, the signals emitted by the base station in the cell located in the moving conveyance don't disturb suddenly the mobile terminals and/or the base station located in the destination area.

According to a particular feature, a first mobile terminal is comprised in the cell of the base station and a second mobile terminal is comprised in the destination area and the wireless cellular telecommunication system comprises:

means for obtaining the signals emitted by the first mobile terminal, means for obtaining the signals emitted by the second mobile terminal, means for combining the signals emitted by the first and the second mobile terminals, means for transferring the combined signals to the base station.

Thus, the base station can demodulate the signals emitted by the mobile terminal located in the cell comprised in the moving conveyance as well as the signals emitted by the mobile terminal located in the destination area. When the moving conveyance arrives at the destination area, this does not create sudden interference to the base station, as the base station already receives the signals emitted by the mobile terminal located in the destination area.

According to a particular feature, the wireless cellular telecommunication system comprises means for emitting the obtained signals emitted by the first mobile terminal in the destination area of the moving conveyance prior to the arrival of the moving conveyance in the destination area.

Thus, when the moving conveyance arrives at the destination area, this does not create sudden interference to a mobile terminal located in the destination area, as the mobile terminal located in the destination area already receives the signals emitted by the mobile terminal located in the destination area.

According to a particular feature, the wireless cellular telecommunication system comprises means for interrupting the emission of the obtained signals emitted by the first mobile terminal in the destination area of the moving conveyance once the moving conveyance is arrived in the destination area.

Thus, when the moving conveyance arrives in the destination area, the signals emitted by the first mobile terminal in the cell located in the moving conveyance don't disturb suddenly the second mobile terminal located in the destination area.

Furthermore, when the moving conveyance leaves the destination area, the signals emitted by the first mobile terminal in the cell located in the moving conveyance don't disturb suddenly the second mobile terminal located in the destination area.

According to a particular feature, another base station is emitting signals in the destination area and the wireless cellular telecommunication system comprises:

means for obtaining the signals emitted by the other base station in the destination area, means for emitting the obtained signals in the cell located in the moving conveyance prior to the arrival of the moving conveyance in the destination area.

Thus, when the moving conveyance arrives at the destination area, this does not create sudden interference to the base station, as the base station already receives the signals emitted by the other base station.

According to a particular feature, the wireless cellular telecommunication system comprises means for interrupting the emission of the obtained signals in the cell located in the moving conveyance once the moving conveyance is arrived in the destination area.

Thus, when the moving conveyance arrives at the destination area, this does not create sudden interference to the base station, as the base station already receives the signals emitted by the other base station.

According to a particular feature, the moving conveyance is an elevator cabin susceptible to move to plural destination floors of a building and the wireless cellular telecommunication system comprises means for emitting the obtained signals in plural floors of the building.

Thus, when the elevator cabin arrives at one floor, the signals emitted by the base station in the cell located in the elevator cabin don't disturb suddenly the mobile terminals and/or the base station located in that floor. As far as the signals emitted by the base station in the cell are also emitted in plural floors, there is no abrupt modification of interferences.

Furthermore, as the signals emitted by the base station in the cell are also emitted in the floors, mobile terminals located in one of the plural floors are able to measure the signals emitted by the base station and a handover may be executed with the base station which emits the signals in the cell comprised in the elevator cabin.

According to a particular feature, a first mobile terminal is comprised in the cell, a second mobile terminal is comprised in the destination floor, a third mobile terminal is comprised in another floor different from the destination floor, and the wireless cellular telecommunication system comprises:

means for obtaining the signals emitted by the first mobile terminal,
  means for obtaining the signals emitted by the second and the third mobile terminals,
  means for combining the signals emitted by the first second and third mobile terminals,
  means for transferring the combined signals to the base station.

Thus, the base station can demodulate the signals emitted by the first mobile terminal located in the cell comprised in the elevator cabin as well as the signals emitted by the second and third mobile terminals. When the elevator cabin arrives at any floor, this does not create sudden interference to the base station, as the base station already receives the signals emitted by the second and third mobile terminals.

According to a particular feature, the wireless cellular telecommunication system comprises means for emitting the obtained signals emitted by the first mobile terminal in the destination floor and the other floor.

Thus, when the elevator cabin arrives at any floor, this does not create sudden interference to the second and third mobile terminals, as the second and third mobile terminals already receive the signals emitted by the first mobile terminal.

According to a particular feature, at least two other base stations are emitting signals respectively in the destination floor and in another floor and the wireless cellular telecommunication system comprises:

means for obtaining the signals emitted by the other base stations in the floors,
  means for emitting the obtained signals in the cell located in the moving conveyance.

Thus, when the elevator cabin arrives at one floor, the signals emitted by the other base stations don't disturb suddenly the base station. As far as the signals emitted by the other base stations are also emitted in the cell located in the elevator cabin, there is no abrupt modification of interferences.

Furthermore, as the signals emitted by the other base stations are also emitted in the cell located in the elevator cabin, the mobile terminal located in the cell in the elevator cabin is able to measure the signals emitted by the other base stations and a handover may be executed with one of the other base stations.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

The characteristics of the invention will emerge more clearly from a reading of the following description of an example of embodiment, the said description being produced with reference to the accompanying drawings, among which:

The present invention is disclosed using an example wherein the wireless telecommunication system is a wireless cellular telecommunication system and the moving conveyance is an elevator cabin located in a building which moves from a floor of the building to another floor of the building. The present invention is also applicable to other wireless telecommunication systems like broadcasting programs wireless systems, or sensor identification network systems. The present invention is also applicable to cases where the moving conveyance is a train or a subway train which moves from a station to the next station.

The building BLD comprises an elevator shaft 60 in which an elevator cabin ELEV is displacing. The elevator cabin ELEV is moving, thanks to an elevator engine 10 controlled by an elevator controller 20, from one floor Flk, with k=1 to K to another floor Fli of the building BLD, with i=1 to K and i≠k, and where K is the number of floors of the building BLD.

Figure 1:
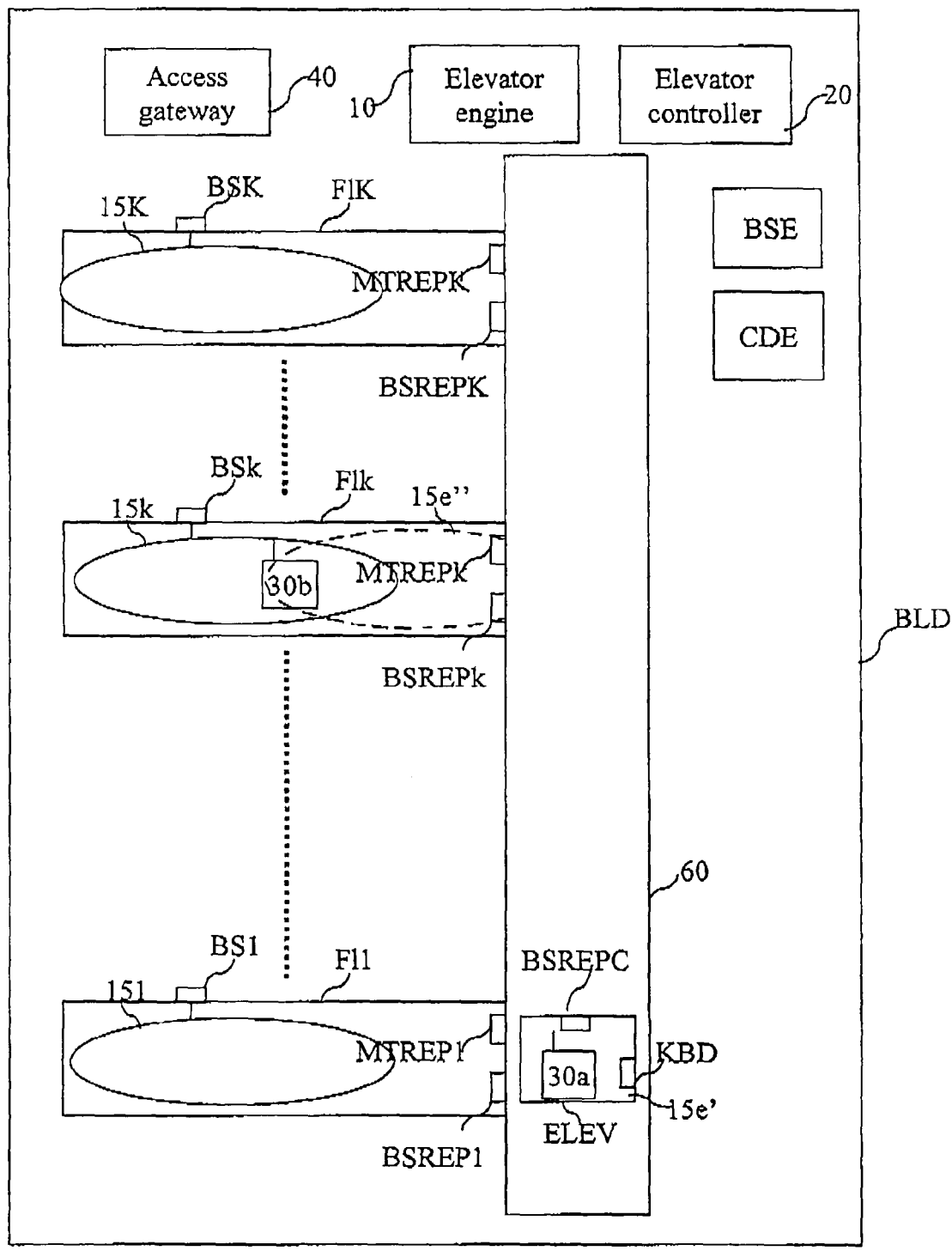
FIG. 1 is a diagram representing a view of a building comprising the wireless telecommunication system for a moving conveyance according to the present invention.

Each floor Flk, with k=1 to K comprises at least one call button, not shown in FIG. 1 which is linked to the elevator controller 20.

At least one of the floors Fli, with k=1 to N comprises at least one base station BSk. As, example and in a non limitative way, each floor Flk, with k=1 to K preferably comprises at least one base station BSk. Each base station BSk enables the mobile terminals 30 which are located in the cell 15k managed by the base station BSk to establish or receive or continue a communication with a remote telecommunication device not shown in the FIG. 1.

Three floors Fl1, Flk and FlK are shown in the FIG. 1 for the sake of clarity. The base station BS1 manages the cell noted 151, the base station BSk manages the cell noted 15k and the base station BSK manages the cell 15K.

In the FIG. 1, only two mobile terminals 30a and 30b are shown, but we can understand that a more important number of mobile terminals 30 are comprised in the building BLD. The mobile terminal 30a is located in the cabin elevator ELEV.

The elevator cabin ELEV comprises a keyboard KBD which enables the selection of at least one destination floor. The keyboard KBD is linked to the elevator controller 20.

From the keyboard KBD and the call buttons, the elevator controller 20 determines the destination floor Flk of the elevator cabin ELEV.

One base station BSE manages the cell 15e which usually covers the area 15e' comprised in the elevator cabin ELEV. When the doors of the elevator cabin open, as example at floor Flk, the cell 15e covers a part of the floor 15f. Such extra cell is represented by the area 15e" in the FIG. 1.

Each Floor Flk, with k=1 to K, comprises a base station repeater BSREPk and a mobile terminal repeater MTREPk.

The cabin elevator ELEV comprises a base station repeater BSREPC.

Each base station repeater BSREPk, with k=1 to K, each mobile terminal repeater MTREPk, and the base station repeater BSREPC is linked to a combination and distribution equipment CDE.

According to the invention, the base station repeater BSREPk and the mobile terminal repeater MTREPk recreate the extra cell 15e", enabling then the cell 15e, comprising the cell 15e' and the area 15e" to cover either the cabin elevator ELEV and a part of at the Floor Flk.

The base station BSE enables the mobile terminals 30 which are located in the cell 15e' managed by the base station BSE to establish or receive or continue a communication with a remote telecommunication device not shown in the FIG. 1.

The base station BSE enables the mobile terminals 30 which are located in the area 15e" managed by the base station BSE to establish or receive or continue a communication with a remote telecommunication device not shown in the FIG. 1.

It has to be noted here that the cell 15e' and the area 15e" forms a cell 15e.

The base station BSE is located in the building BLD, as example, near the elevator controller 20 or in the elevator cabin ELEV.

When the mobile terminal 30a moves out from the elevator cabin ELEV, it may enter in the cell 15k managed by the base station BSk. The mobile terminal 30b is then located in the cell 15k managed by the base station BSk or in the area 15e".

Each base station repeater BSREPk transfers the downlink signals in the cell 15k and/or 15e" transferred by the base station BSE to each mobile terminal 30 located in the cell 15e'. Each base station repeater BSREPk receives and transfers to the combination and distribution equipment CDE the uplink signals transferred by the mobile terminals 30 located in the cell 15k or the area 15e" to the base station BSk.

Each mobile terminal repeater MTREPk repeats in the cell 15k and/or 15e" the uplink signals transferred by the mobile terminals 30 located in the cell 15e' to the base station BSE. Each mobile terminal repeater MTREPk receives and transfers to the combination and distribution equipment CDE the downlink signals transferred by the base station BSk to the mobile terminals 30 located in the cell 15k or the area 15e".

The base station repeater BSREPC transfers to the combination and distribution equipment CDE, the uplink signals transferred by the mobile terminals 30 located in the cell 15e' to the base station BSE.

The base station repeater BSREPC transfers to the mobile terminal 30 located in the cell 15e' of the base station BSE, the downlink signal transferred by the base station BSE to the mobile terminals 30 located in the cell 15e' preferably combined with other downlink signals transferred by the base stations BSk in the cell 15k of the destination floor.

The base stations BSk, with k=1 to K, and the base station BSE are base stations of a wireless cellular telecommunication network.

Preferably, the base stations BSk, with i=1 to K, and the base station BSE are linked to an access gateway 40 which is linked to a telecommunication network not shown in the FIG. 1.

The telecommunication network is, as example and in a non limitative way, a dedicated wired network, part of public network like a public switched network, an IP based network, a wireless network, an Asynchronous Transfer Mode network or a combination of above cited networks.

The access gateway 40 is also named a Mobility Management Entity or a Serving GPRS Support Node or a Foreign Agent or a Visitor Location Register or a Public Land Mobility Network server.

The base stations BSk, with k=1 to K, and the base station BSE are also named a node or a node B or an enhanced node B or an access point.

The mobile terminals 30 are terminals like mobile phones, personal digital assistants, or personal computers.

Figure 2:
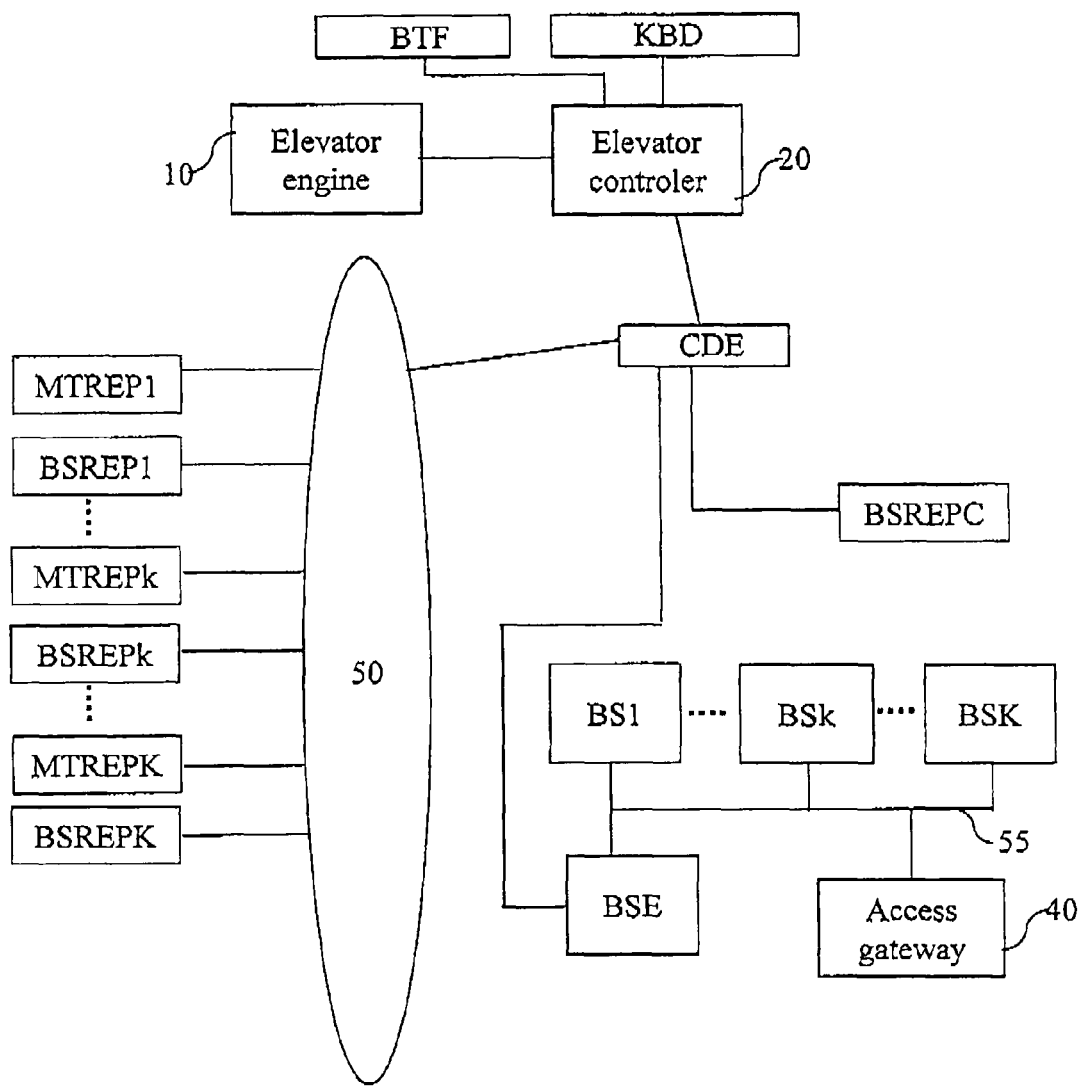
FIG. 2 is a block diagram depicting the interconnections between different devices of the wireless telecommunication system for a moving conveyance.

FIG. 2 is a block diagram depicting the interconnections between different devices of the wireless telecommunication system for a moving conveyance.

The elevator controller 20 is linked to the call buttons, the keyboard KBD, the elevator engine 10 through a dedicated wiring system.

From the keyboard KBD and the call buttons, the elevator controller 20 determines the destination floor Flk of the elevator cabin ELEV, commands the elevator engine 10 according the determined destination in order to move the elevator cabin ELEV to the destination floor Flk.

The elevator controller 20 commands also the opening of the doors of the elevator cabin ELEV at the end of motion of the elevator cabin ELEV, and the closing of the doors of the elevator cabin ELEV prior to starting motion of the elevator cabin ELEV.

The elevator controller 20 is also linked to the combination and distribution equipment CDE. According to the invention, the elevator controller 20 transfers messages to the combination and distribution equipment CDE indicating the destination floor Fli of the elevator cabin ELEV. In a variant of realisation, the messages comprise a list, preferably ordered of destination floors Fl.

The elevator controller 20 transfers also messages to the combination and distribution equipment CDE indicating if the elevator cabin ELEV is moving and if the elevator's doors are opening and/or closing.

The combination and distribution equipment CDE is linked through a communication network 50 to the station repeaters BSREP1 to BSREPK and to the mobile terminal repeaters MTREP1 to MTREPK. The network 50 is as example and in a non limitative way, a bus or an optic fiber network.

The combination and distribution equipment CDE is also linked to the base station repeater BSREPC and to the base station BSE through a bus or an optical fiber network.

In a variant, the link between the combination and distribution equipment CDE and the base station repeater BSREPC is a high data rate wireless link which is robust to the motion of the moving conveyance.

The base stations BSE and BS1 to BSK are linked together through a network 55. The network 55 is, as example and in a non limitative way, a dedicated wired network, part of public network like a public switched network, an IP based network, a wireless network, an Asynchronous Transfer Mode network or a combination of above cited networks.

The access gateway is also linked to the network 55.

Figure 3:
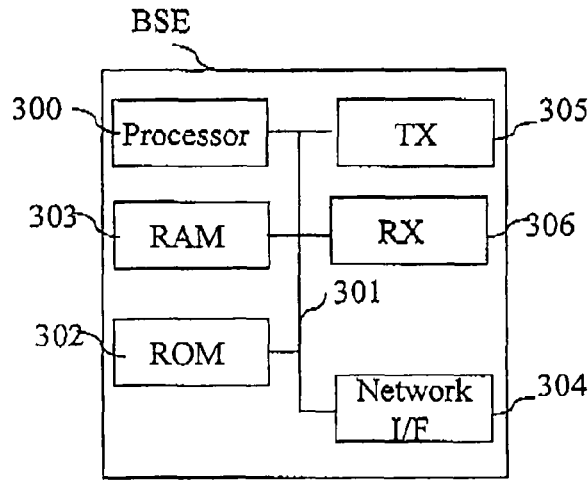
FIG. 3 is a block diagram of a base station which manages the cell comprised in the elevator cabin according to the present invention.

FIG. 3 is a block diagram of a base station which manages the cell comprised in the elevator cabin according to the present invention.

The base station BSE has, for example, an architecture based on components connected together by a bus 301 and a processor 300 controlled by the program as disclosed in the FIG. 5 when the combination and distribution equipment CDE is included in the base station BSE.

It has to be noted here that the base station BSE is, in a variant, implemented under the form of one or several dedicated integrated circuits which execute the same operations as the one executed by the processor 300 as disclosed hereinafter.

The bus 301 links the processor 300 to a read only memory ROM 302, which is a non-transitory computer readable memory storing the program as disclosed in FIG. 5, a random access memory RAM 303, a network interface 304, a transmission module 305 and a reception module 306.

The transmission module 305 transfers baseband digital signals to be transferred in the cell 15e to mobile terminals 30. The reception module 306 receives baseband digital signals from mobile terminals 30 located in the cell 15e.

In a variant, the transmission module 305 transfers analogue radio frequency signals or optical signals to be transferred in the cell 15e to mobile terminals 30. The reception module 306 receives analogue radio frequency or optical signals from mobile terminals 30 located in the cell 15e.

Figure 4:
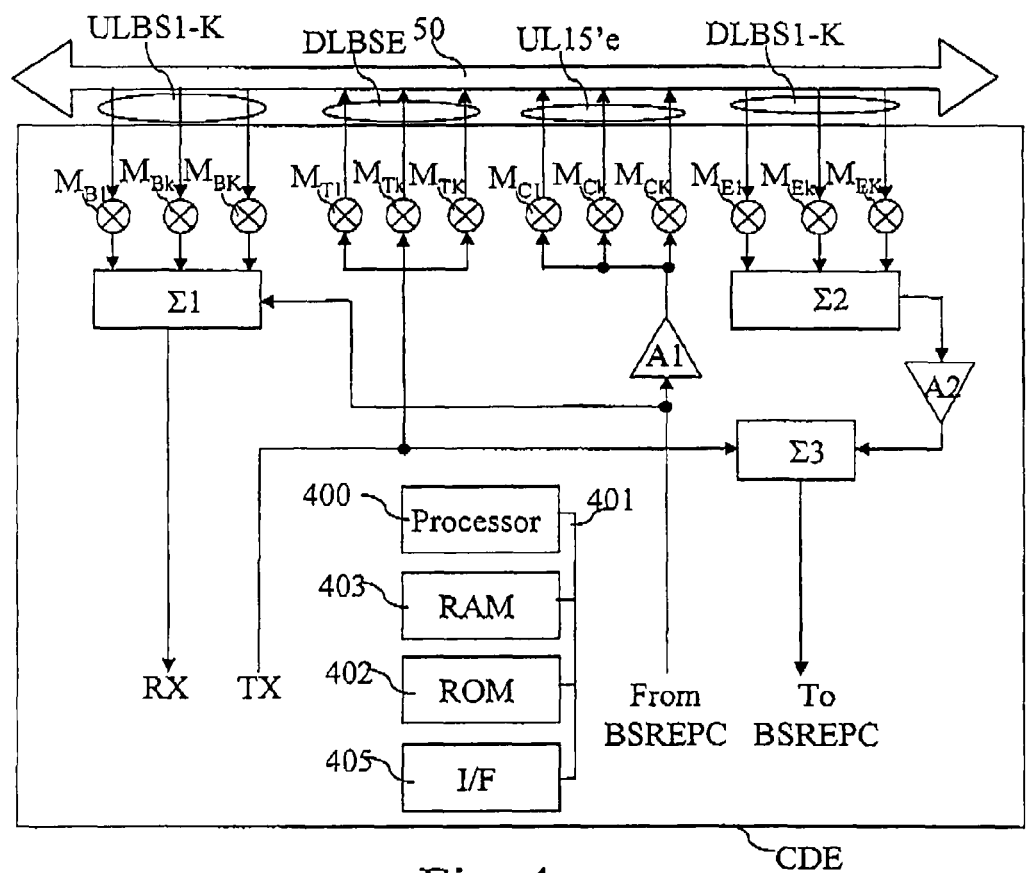
FIG. 4 is a block diagram of a combination and distribution equipment according to the present invention.

FIG. 4 is a block diagram of a combination and distribution equipment according to the present invention.

The combination and distribution equipment CDE receives from the base station repeaters BSREP1 to BSREPK, the uplink signals transferred by the mobile terminals 30 located in the cells 151 to 15K to the respective base station BS1 to BSK. The uplink signals transferred by the mobile terminals 30 received from the base station repeaters BSREP1 to BSREPK are noted ULBS1-K in the FIG. 4.

The combination and distribution equipment CDE receives from the mobile terminal repeaters MTREP1 to MTREPK, the downlink signals transferred by the base stations BS1 to BSK to the mobile terminals 30 located in their respective cells 151 to 15K. The downlink signals transferred by the base stations BS1 to BSK and received from the mobile repeaters MTREP1 to MTREPK are noted DLBS1-K in the FIG. 4.

The combination and distribution equipment CDE receives from the base station BSE the baseband downlink signals transferred by the base station BSE through the transmission module. These signals are noted TX in the FIG. 4.

The combination and distribution equipment CDE receives from the base station repeater BSREPC the uplink signals transferred by the mobile terminals 30 located in the cell 15e' to the base station BSE.

The signals ULBS1-K are respectively multiplied by a multiplier $M_{B1}$ to $M_{BK}$ using a respective coefficient $coeff_{B1}$ to $coeff_{BK}$ determined by the combination and distribution equipment CDE according to the provenance floor and/or the destination floor and/or according to the fact that the doors are opened or not.

The multiplied signals are summed by a summation module $\Sigma 1$ in combination with the uplink signals transferred by the mobile terminals 30 located in the cell 15e' to the base station received from the base station repeater BSREPC.

The signals summed by the summation module $\Sigma 1$ are transferred to the reception module 306 of the base station BSE.

The signals DLBS1-K are respectively multiplied by a multiplier $M_{E1}$ to $M_{EK}$ using a respective coefficient $coeff_{E1}$ to $coeff_{EK}$ determined by the combination and distribution equipment CDE according to the provenance floor and/or the destination floor and/or according to the fact that the doors are opened or not.

The multiplied signals are summed by a summation module $\Sigma 2$. The summed signals are amplified by an amplifier A2. The signals amplified by the amplifier A2 are summed by a summation module $\Sigma 3$ with the TX signals and transferred to the base station repeater BSREPC.

The TX signals are duplicated into K signals and each duplicated signal is multiplied by a multiplier $M_{T1}$ to $M_{TK}$ using a respective coefficient $coeff_{T1}$ to $coeff_{TK}$ determined by the combination and distribution equipment CDE according to the destination floor and/or according to the fact that the doors are opened or not. Each multiplied signal is transferred respectively to a base station repeater BSREPk, with k=1 to K.

The signals transferred by the base station repeater BSREPC representative of the signals transferred by the mobile terminals 30 located in the cell 15e' are amplified by an amplifier A1. The signals amplified by the amplifier A1 are duplicated into K signals and each duplicated signal is multiplied by a multiplier $M_{C1}$ to $M_{CK}$ using a respective coefficient $coeff_{C1}$ to $coeff_{CK}$ determined by the combination and distribution equipment CDE according to the destination floor and/or according to the fact that the doors are opened or not. Each multiplied signal is transferred respectively to a mobile terminal repeater MSREPk, with k=1 to K.

When the combination and distribution equipment CDE is not included in the base station BSE, the combination and distribution equipment CDE further comprises components connected together by a bus 401 and a processor 400 controlled by the program as disclosed in the FIG. 5.

The bus 401 links the processor 400 to a read only memory ROM 402, a random access memory RAM 403 and an elevator interface 405.

Through the elevator interface 405, the processor 400 receives from the elevator controller 20, messages indicating the destination floor Fli of the elevator cabin ELEV. In a variant of realisation, the messages comprise a list, preferably ordered of destination floors Fl.

Through the elevator interface 405, the processor 400 receives also messages indicating if the elevator cabin ELEV is moving and if the elevator's doors are opening and/or closing.

Figure 5A:
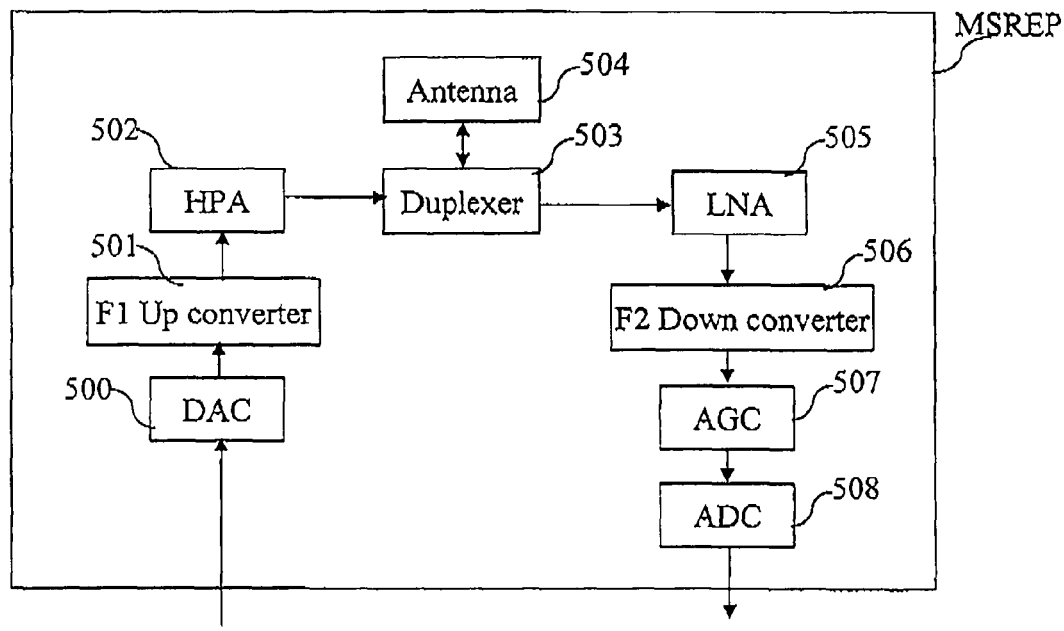
FIG. 5a is a block diagram of a mobile terminal repeater according to the present invention.

FIG. 5a is a block diagram of a mobile terminal repeater according to the present invention.

Each mobile terminal repeater MTREP1 to MTREPK comprises a digital to analog converter (DAC) 500 which converts the data to be transferred into analog signal, a frequency up converter 501 which multiplies the analog signal by a carrier frequency F1 and shapes the signal with appropriate filtering, a High Power Amplifier (HPA) 502, a duplexer 503 which duplexes the analog signals multiplied by the carrier frequency F1 to be transferred through an antenna 504 and the signals received by the antenna 504.

Each mobile terminal repeater MTREP1 to MTREPK comprises also a Low-Noise Amplifier (LNA) 505, a frequency down converter 506 which filters the signals received by the antenna 504 in the appropriate frequency band and multiplies the signals received by the antenna 504 by a carrier frequency F2, an Auto Gain Controller (AGC) 507 and an Analog to Digital Converter (ADC) 508 which transforms the signals received by the antenna 504 and frequency down converted into a digital form.

In a variant, the input signals of the mobile terminal repeaters MTREP1 to MTREPK are analogue RF signals. According to that variant, the modules 500, 501, 504 and 506 are removed.

Figure 5B:
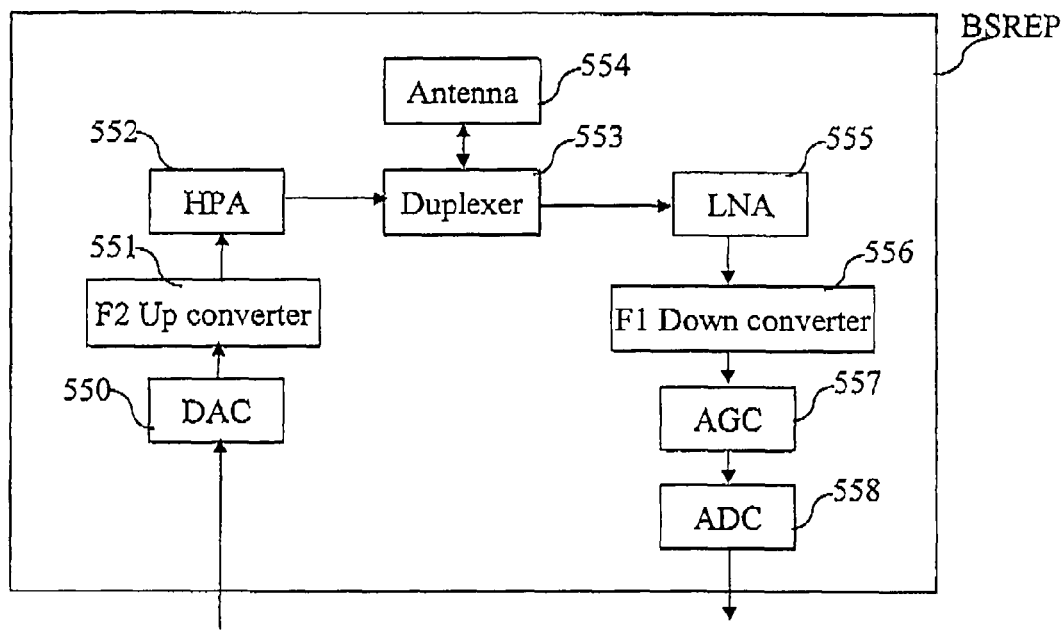
FIG. 5b is a block diagram of a base station repeater according to the present invention.

FIG. 5b is a block diagram of a base station repeater according to the present invention.

Each base station repeater BSREP1 to BSREPK and BSREPC comprises a digital to analog converter (DAC) 550 which converts the data to be transferred into analog signal, a frequency up converter 551 which multiplies the analog signal by a carrier frequency F2 and shapes the signal with appropriate filtering, a High Power Amplifier 552, a duplexer 553 which duplexes the analog signal multiplied by the carrier frequency F2 to be transferred through an antenna 554 and the signals received by the antenna 554.

Each base station repeater BSREP1 to BSREPK and BSREPC comprises also a Low-Noise Amplifier 555 a frequency down converter 556 which filters the signals received by the antenna 554 in the appropriate frequency band and multiplies the signals received by the antenna 554 by a carrier frequency F1, an Auto Gain Controller (AGC) 557 and an Analog to Digital Converter 558 which transforms the signals received by the antenna 554 and frequency down converted into a digital form.

In a variant, the input signals of the base station repeaters BSREP1 to BSREPK and BSREPC are analogue RF signals. According to that variant, the modules 550, 551, 554 and 556 are removed.

Figure 6:
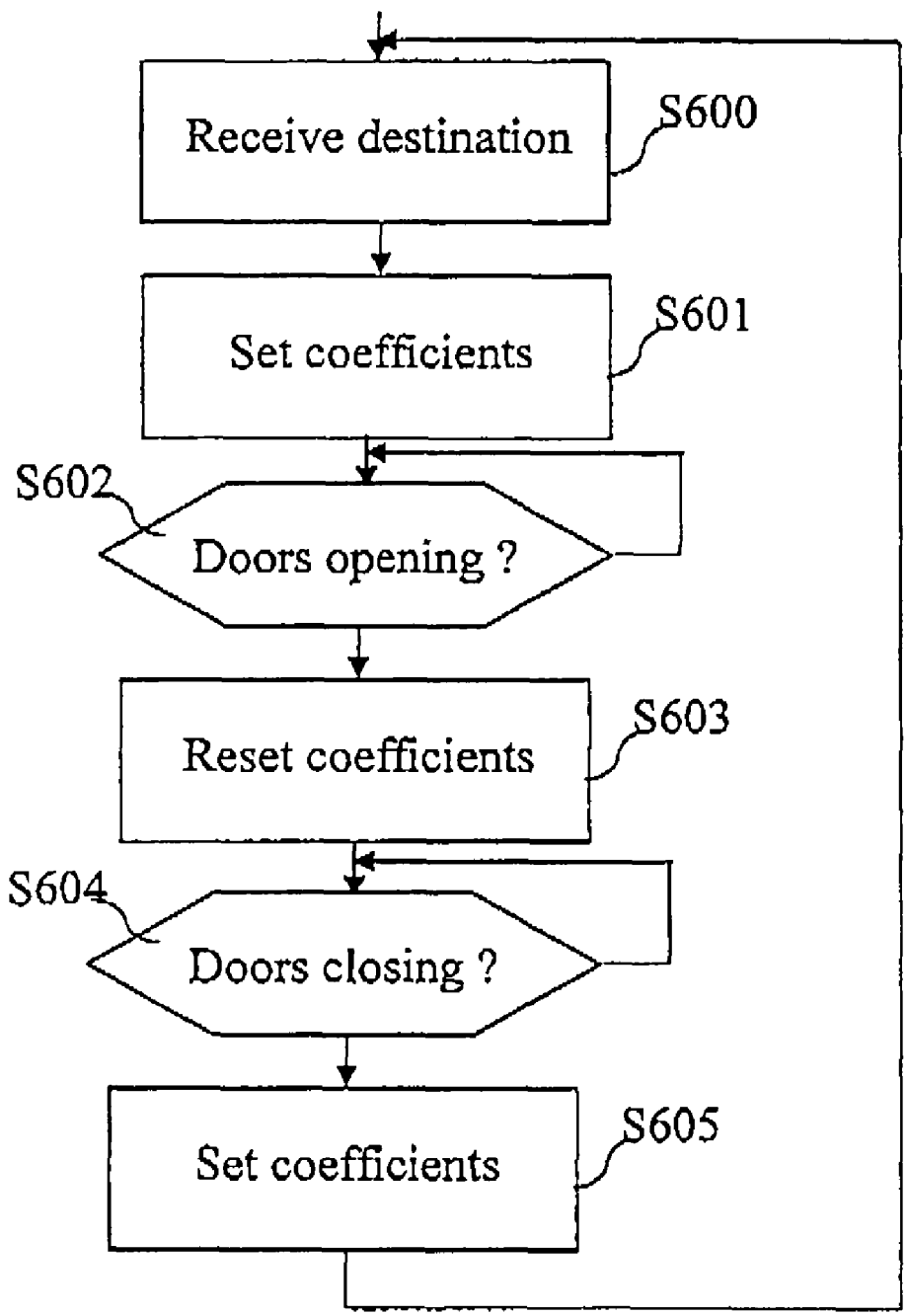
FIG. 6 represents an algorithm executed according to the present invention.

FIG. 6 represents an algorithm executed according to the present invention.

The present algorithm is more precisely executed by the processor 400 of the combination and distribution equipment CDE or by the processor 300 of the base station BSE when the combination and distribution equipment CDE is comprised in the base station BSE.

The present algorithm will be described when it is executed by the processor 400 of the combination and distribution equipment CDE.

At step S600, the processor 400 detects the reception through the elevator interface 405 of a message transferred by the elevator controller 20 indicating the destination floor of the elevator cabin ELEV.

At next step S601, the processor 400 sets the coefficients $coeff_{B1}$ to $coeff_{BK}$, $coeff_{T1}$ to $coeff_{TK}$, $coeff_{C1}$ to $coeff_{CK}$ and $coeff_{E1}$ to $coeff_{EK}$ used by the respective multipliers $M_{B1}$ to $M_{BK}$, $M_{T1}$ to $M_{TK}$, $M_{C1}$ to $M_{CK}$ and $M_{E1}$ to $M_{EK}$.

According to a first example of realisation, the processor 400 sets the coefficients $coeff_{B1}$ to $coeff_{BK}$, $coeff_{T1}$ to $coeff_{TK}$, $coeff_{C1}$ to $coeff_{CK}$ and $coeff_{E1}$ to $coeff_{EK}$ used by the respective multipliers $M_{B1}$ to $M_{BK}$, $M_{T1}$ to $M_{TK}$, $M_{C1}$ to $M_{CK}$ and $M_{E1}$ to $M_{EK}$ to the value one.

According to a second example of realisation, the processor 400 sets the coefficients $coeff_{B1}$ to $coeff_{BK}$, $coeff_{C1}$ to $coeff_{CK}$ used by the respective multipliers $M_{B1}$ to $M_{BK}$, $M_{C1}$ to $M_{CK}$ to the value one and the coefficients $coeff_{T1}$ to $coeff_{TK}$ and $coeff_{E1}$ to $coeff_{EK}$ used by the respective multipliers $M_{T1}$ to $M_{TK}$ and $M_{E1}$ to $M_{EK}$ to the null value.

According to a third example of realisation, the processor 400 sets the coefficients $coeff_{B1}$ to $coeff_{BK}$, $coeff_{C1}$ to $coeff_{CK}$ used by the respective multipliers $M_{B1}$ to $M_{BK}$, $M_{C1}$ to $M_{CK}$ to the null value and the coefficients $coeff_{T1}$ to $coeff_{TK}$ and $coeff_{E1}$ to $coeff_{EK}$ used by the respective multipliers $M_{T1}$ to $M_{TK}$ and $M_{E1}$ to $M_{EK}$ to the value one.

According to a fourth example of realisation, if the destination floor is the floor Flk, the processor 400 sets the coefficients $coeff_{B1}$ to $coeff_{Bk-1}$, $coeff_{Bk+1}$ to $coeff_{BK}$ used by the respective multipliers $M_{B1}$ to $M_{Bk-1}$, $M_{Bk+1}$ to $M_{BK}$ to the null value, the coefficient $coeff_{Bk}$ used by the multiplier $M_{Bk}$ to the value one, the coefficients $coeff_{T1}$ to $coeff_{Tk-1}$, $coeff_{Tk+1}$ to $coeff_{TK}$ used by the respective multipliers $M_{T1}$ to $M_{Tk-1}$, $M_{Tk+1}$ to $M_{TK}$ to the null value, the coefficient $coeff_{Tk}$ used by the multiplier $M_{Tk}$ to the value one, the coefficients $coeff_{C1}$ to $coeff_{Ck-1}$, $coeff_{Ck+1}$ to $coeff_{CK}$ used by the respective multipliers $M_{C1}$ to $M_{Ck-1}$, $M_{Ck+1}$ to $M_{CK}$ to the null value, the coefficient $coeff_{Ck}$ used by the multiplier $M_{Ck}$ to the value one, the coefficients $coeff_{E1}$ to $coeff_{Ek-1}$, $coeff_{Ek+1}$ to $coeff_{EK}$ used by the respective multipliers $M_{E1}$ to $M_{Ek-1}$, $M_{Ek+1}$ to $M_{EK}$ to the null value and the coefficient $coeff_{Ek}$ used by the multiplier $M_{EK}$ to the value one.

According to a fifth example of realisation, if the destination floor is the floor Flk the processor 400 sets the coefficients $coeff_{Bk}$ and $coeff_{Ck}$ used by the respective multipliers $M_{Bk}$ and $M_{Ck}$ to the value one and other coefficients to the null value.

According to a sixth example of realisation, if the destination floor is the floor Flk the processor 400 sets the coefficients $coeff_{Tk}$ and $coeff_{Ek}$ used by the respective multipliers $M_{Tk}$ and $M_{Ek}$ to the value one and other coefficients to the null value.

In a variant realisation of the invention, the values of the coefficients $coeff_{B1}$ to $coeff_{BK}$, $coeff_{T1}$ to $coeff_{TK}$, $coeff_{C1}$ to $coeff_{CK}$ and $coeff_{E1}$ to $coeff_{EK}$ used by the respective multipliers $M_{B1}$ to $M_{BK}$, $M_{T1}$ to $M_{TK}$, $M_{C1}$ to $M_{CK}$ and $M_{E1}$ to $M_{EK}$ are progressively modified up to the determined values.

In another variant of the invention, signals resulting from a multiplier using coefficients having a null value are not transmitted through the communication network 50.

At next step S602, the processor 400 checks, through the elevator interface 405, if a message is received from the elevator controller 20 indicating that the doors of the cabin elevator ELEV are opening.

If the doors of the cabin elevator ELEV are opening, the processor 400 moves to step S603, otherwise, the processor 400 returns to step S602.

At step S602, the processor 300 resets all the coefficients $coeff_{Bk}$, $coeff_{Tk}$, $coeff_{Ck}$ and $coeff_{Ek}$ used by the respective multipliers $M_{Bk}$, $M_{Tk}$, $M_{Ck}$ and $M_{Ek}$ which are associated to the destination floor Flk to the null value. It has to be noted here that in a variant, during the opening of the doors, the processor 400 decreases progressively the value of the coefficients up to the null value. In yet another variant, the coefficients $coeff_{Bk}$, $coeff_{Tk}$, $coeff_{Ck}$ and $coeff_{Ek}$ used by the respective multipliers $M_{Bk}$, $M_{Tk}$, $M_{Ck}$ and $M_{Ek}$ are unmodified and always set to the value one.

As far as the doors are opened, the signals transferred by the repeaters MTREPk, BSREPk and BSREPC don't need to repeat the signals ULBS1-K, DLBSE, UL 15'e and DLBS1-K, these signals being directly received or transferred by the base station repeater BSREPC.

At next step S402, the processor 400 checks if a message is received through the elevator interface 405 from the elevator controller 20 indicating that the doors of the cabin elevator ELEV are closing.

If the doors of the cabin elevator ELEV are closing, the processor 400 moves to step S605, otherwise, the processor 400 returns to step S604.

At step S605, the processor 300 sets all the coefficients $coeff_{Bk}$, $coeff_{Tk}$, $coeff_{Ck}$ and $coeff_{Ek}$ used by the multipliers $M_{Bk}$, $M_{Tk}$, $M_{Ck}$ and $M_{Ek}$ to the value set previously at step S601. It has to be noted here that in a variant, during the closing of the doors or after the closing of the doors, the processor 400 modifies progressively the value of the coefficients up to the value set previously at step S601. In yet another variant, the coefficients $coeff_{Bk}$, $coeff_{Tk}$, $coeff_{Ck}$ and coeff$_{Ck}$ used by the respective multipliers M$_{Bk}$, M$_{Tk}$, M$_{Ck}$ and M$_{Ek}$ are unmodified and always set to the value one.

After that, the processor 400 returns to step S600.

Naturally, many modifications can be made to the embodiments of the invention described above without departing from the scope of the present invention.

The invention claimed is:

1. A wireless cellular telecommunication system comprising;
  a base station managing a first cell included in an area located in a moving conveyance and emitting signals in the area located in the moving conveyance, the moving conveyance being moving, and
  a distributing equipment and at least one repeater, wherein:
  the distributing equipment is configured to obtain information representative of a destination area of the moving conveyance in which the signals emitted by the base station in the area located in the moving conveyance are not received, the destination area of the moving conveyance comprising a second cell;
  the distributing equipment further configured to obtain the signals emitted by the base station in the area located in the moving conveyance, and comprising at least one multiplier multiplying the obtained signals using a respective coefficient having a respective target value determined according to the information representative of the destination area;
  the distributing equipment further configured to provide the multiplied signals to the at least one repeater, and to progressively increase the coefficient up to the target value when the moving conveyance gets closer to the destination area,
  the at least one repeater configured to create a third cell by emitting the signals received from the distributing equipment in the destination area of the moving conveyance prior to the arrival of the moving conveyance in the destination area, the third cell covering an area that the first cell covers when the moving conveyance arrives at the destination area, such that the signals emitted by the base station in the area located in the moving conveyance are progressively repeated in the destination area of the moving conveyance prior to the arrival of the moving conveyance in the destination area for smoothing interference variations in the second cell due to the first cell when the moving conveyance arrives at the destination area.

2. The wireless cellular telecommunication system according to claim 1, wherein the wireless cellular telecommunication system further comprises:
  means for interrupting the emission of the obtained signals in the destination area of the moving conveyance once the moving conveyance arrives in the destination area.

3. The wireless cellular telecommunication system according to claim 2, wherein,
  a first mobile terminal is comprised in the second cell of the destination area, and
  the wireless cellular telecommunication system further comprises:
  means for obtaining signals emitted by the first mobile terminal; and
  means for emitting, in the first cell included in the area of the moving conveyance, the obtained signals emitted by the second mobile terminal.

4. The wireless cellular telecommunication system according to claim 3, wherein,
  a second mobile terminal is comprised in the first cell of the base station comprised in the moving conveyance, and
  said base station in the moving conveyance obtaining signals emitted by the second mobile terminal; and
  said repeater emitting the obtained signals emitted by the second mobile terminal in the third cell prior to the arrival of the moving conveyance in the destination area.

5. The wireless cellular telecommunication system according to claim 4, further comprising:
  means for interrupting the emission of the obtained signals emitted by the first mobile terminal in the third cell once the moving conveyance arrives in the destination area.

6. The wireless cellular telecommunication system according to claim 2, wherein,
  a second base station emits signals in the destination area, the second base station managing the second cell, and
  the wireless cellular telecommunication system further comprises:
  means for obtaining the signals emitted by the second base station in the destination area; and
  means for emitting the obtained signals emitted by the second base station in the destination area in the first cell included in the area of the moving conveyance prior to the arrival of the moving conveyance in the destination area.

7. The wireless cellular telecommunication system according to claim 6, further comprising:
  means for interrupting the emission of the obtained signals in the first cell included in the area of the moving conveyance once the moving conveyance arrives in the destination area.

8. The wireless cellular telecommunication system according to claim 1, wherein,
  the moving conveyance is an elevator cabin susceptible to move to plural destination floors of a building, and
  the wireless cellular telecommunication system further comprises:
  means for creating third cells by emitting the obtained signals in plural floors of the building.

9. The wireless cellular telecommunication system according to claim 8, wherein,
  a first mobile terminal is comprised in the second cell of the destination floor,
  at least one second mobile terminal is comprised in at least one respective another cell of respective at least one other floor different from the destination floor, and
  the wireless cellular telecommunication system further comprises:
  means for obtaining signals emitted by the first and second mobile terminals,
  said distributing equipment combining the signals emitted by the first and second mobile terminals; and
  means for emitting the combined signals in the first cell included in the area of the moving conveyance.

10. The wireless cellular telecommunication system according to claim 9, wherein,
  a third mobile terminal is comprised in the first cell included in the area of the moving conveyance, and
  said base station in said moving conveyance obtaining signals emitted by the third mobile terminal; and
  said repeater and a further repeater respectively emitting the obtained signals emitted by the third mobile terminal in the third cells of the destination floor and of the at least one other floor.

11. The wireless cellular telecommunication system according to claim 9, wherein,
  at least one other base station emits signals respectively in said at least one other cell of said at least one other floor, and said distributing equipment obtaining the signals emitted by the at least one other base station in said respective at least one other floor; and, said base station in said moving conveyance emitting the obtained signals in the first cell included in the area of the moving conveyance.

12. A wireless cellular telecommunication method, wherein a base station managing a first cell included in an area located in a moving conveyance emits signals in the area located in a moving conveyance, a distributing equipment obtains information representative of a destination area of the moving conveyance, said destination area comprising a second cell in which the signals emitted by the base station in the area located in the moving conveyance are not received, and at least one repeater emits signals to the second cell, said method comprising:

obtaining by means of said distributing equipment information representative of a destination area of the moving conveyance in which the signals emitted by the base station in the area located in the moving conveyance are not received;

obtaining by means of said distributing equipment the signals emitted by the base station in the area located in the moving conveyance;

multiplying the obtained signals using a respective coefficient having a respective target value determined according to the information representative of the destination area;

providing by means of said distributing equipment the multiplied signals to the at least one repeater, and progressively increasing the coefficient up to the target value when the moving conveyance gets closer to the destination area, creating by at least one repeater a third cell by emitting the signals received from the distributing equipment in the destination area of the moving conveyance prior to the arrival of the moving conveyance in the destination area, the third cell covering an area that the first cell covers when the moving conveyance arrives at the destination area, such that the signals emitted by the base station in the area located in the moving conveyance are progressively repeated in the destination area of the moving conveyance prior to the arrival of the moving conveyance in the destination area for smoothing interference variations in the second cell due to the first cell when the moving conveyance arrives at the destination area.

13. The method according to claim 12, wherein the method further comprises:

interrupting the emission in the destination area of the signals received from the distributing equipment once the moving conveyance arrives in the destination area.

14. A non-transitory computer readable medium storing computer program instructions which when executed by a programmable computer results in performance of steps of a method for wireless cellular telecommunication, wherein a base station managing a first cell included in an area located in a moving conveyance emits signals in the area located in a moving conveyance, a distributing equipment obtains information representative of a destination area of the moving conveyance, said destination area comprising a second cell in which the signals emitted by the base station in the area located in the moving conveyance are not received, and at least one repeater emits signals to the second cell, said method comprising:

obtaining by means of said distributing equipment information representative of a destination area of the moving conveyance in which the signals emitted by the base station in the area located in the moving conveyance are not received;

obtaining by means of said distributing equipment the signals emitted by the base station in the area located in the moving conveyance;

multiplying the obtained signals using a respective coefficient having a respective target value determined according to the information representative of the destination area;

providing by means of said distributing equipment the multiplied signals to the at least one repeater, and progressively increasing the coefficient up to the target value when the moving conveyance gets closer to the destination area, creating by at least one repeater a third cell by emitting the signals received from the distributing equipment in the destination area of the moving conveyance prior to the arrival of the moving conveyance in the destination area, the third cell covering an area that the first cell covers when the moving conveyance arrives at the destination area, such that the signals emitted by the base station in the area located in the moving conveyance are progressively repeated in the destination area of the moving conveyance prior to the arrival of the moving conveyance in the destination area for smoothing interference variations in the second cell due to the first cell when the moving conveyance arrives at the destination area.

15. The non-transitory computer readable medium according to claim 14, further storing instructions which when executed by said programmable computer results in performance of the method further comprising:

interrupting the emission in the destination area of the signals received from the distributing equipment once the moving conveyance arrives in the destination area.

16. A wireless cellular telecommunication system comprising a telecommunication device and a base station managing a first cell included in an area located in a moving conveyance and emitting signals in the area located in the moving conveyance, the moving conveyance being moving, and a distributing equipment and at least one repeater, wherein:

the distributing equipment is configured to obtain information representative of a destination area of the moving conveyance in which the signals emitted by the mobile terminal in the area located in the moving conveyance are not received, the destination area of the moving conveyance comprising a second cell;

the distributing equipment further configured to obtain the signals emitted by the mobile terminal in the area located in the moving conveyance, and comprising at least one multiplier multiplying the obtained signals using a respective coefficient having a respective target value determined according to the information representative of the destination area;

the distributing equipment further configured to provide the multiplied signals to the at least one repeater, and to progressively increase the coefficient up to the target value when the moving conveyance gets closer to the destination area, the at least one repeater configured to create a third cell by emitting the signals received from the distributing equipment in the destination area of the moving conveyance prior to the arrival of the moving conveyance in the destination area, the third cell covering an area that the first cell covers when the moving conveyance arrives at the destination area, such that the signals emitted by the mobile terminal in the area located in the moving conveyance are progressively repeated in the destination area of the moving conveyance prior to the arrival of the moving conveyance in the destination area for smoothing interference variations in the second cell due to the first cell when the moving conveyance arrives at the destination area.

17. A wireless cellular telecommunication method, wherein a mobile terminal emits signals in a first cell managed by a base station and included in an area located in a moving conveyance, a distributing equipment obtains information representative of a destination area of the moving conveyance, said destination area comprising a second cell in which the signals emitted by the mobile terminal in the area located in the moving conveyance are not received, and at least one repeater emits signals to the second cell, said method comprising:

obtaining by means of said distributing equipment information representative of a destination area of the moving conveyance in which the signals emitted by the mobile terminal in the area located in the moving conveyance are not received;

obtaining by means of said distributing equipment the signals emitted by the mobile terminal in the first cell;

multiplying the obtained signals using a respective coefficient having a respective target value determined according to the information representative of the destination area;

providing by means of said distributing equipment the multiplied signals to the at least one repeater, and progressively increasing the coefficient up to the target value when the moving conveyance gets closer to the destination area, creating by at least one repeater a third cell by emitting the signals received from the distributing equipment in the destination area of the moving conveyance prior to the arrival of the moving conveyance in the destination area, the third cell covering an area that the first cell covers when the moving conveyance arrives at the destination area, such that the signals emitted by the mobile terminal in the area located in the moving conveyance are progressively repeated in the destination area of the moving conveyance prior to the arrival of the moving conveyance in the destination area for smoothing interference variations in the second cell due to the first cell when the moving conveyance arrives at the destination area.

\* \* \* \* \*